United States Patent [19]

Billings

[11] Patent Number: 5,127,502

[45] Date of Patent: Jul. 7, 1992

[54] ELECTROMAGNETIC SPRING CLUTCH WITH BALANCED AXIAL FORCES

[75] Inventor: Philip A. Billings, Fairport, N.Y.

[73] Assignee: Xerox Corporation, Stamford, Conn.

[21] Appl. No.: 767,443

[22] Filed: Sep. 30, 1991

[51] Int. Cl.⁵ .................... F16D 27/105; F16D 13/08
[52] U.S. Cl. .................... 192/35; 192/81 C; 192/84 T
[58] Field of Search ............ 192/35, 41 S, 81 C, 192/84 T, 12 BA

[56] References Cited

U.S. PATENT DOCUMENTS

| | | | |
|---|---|---|---|
| 3,006,448 | 10/1961 | Fox | 192/81 C |
| 3,185,276 | 5/1965 | Sajovec, Jr. | 192/84 T |
| 3,637,056 | 1/1972 | Baer | 192/12 BA |
| 3,905,458 | 9/1975 | Mehrbrodt | 192/35 X |
| 3,974,902 | 8/1976 | Wahtstedt et al. | 192/84 T |
| 4,030,584 | 6/1977 | Lowery et al. | 192/84 T |
| 4,263,995 | 4/1981 | Wahlstedt | 192/35 |
| 4,321,992 | 3/1982 | Gallo | 192/81 C |
| 4,465,171 | 8/1984 | Koyama | 192/81 C |
| 4,638,899 | 1/1987 | Kossett | 192/81 C |

FOREIGN PATENT DOCUMENTS 52721 6/1982 European Pat. Off. .......... 192/84 T
63-293328 11/1988 Japan ................... 192/84 T

*Primary Examiner*—Richard Lorence
*Attorney, Agent, or Firm*—R. Hutter

[57] ABSTRACT

An electromagnetically actuated spring clutch permits transference of rotational motion from an input hub to a coaxially-disposed rotatable shaft. A selectively actuable source of magnetic flux, such as an electromagnetic coil, is disposed around at least a portion of the shaft with a space therebetween. A housing, at least a portion of which is conductive of magnetic flux, substantially envelops the outer surface of the source. A shaft flange, also conductive of magnetic flux, is disposed around a portion of the shaft. A helical spring, having a first end attached to the input hub and a free end disposed adjacent the shaft flange, is loosely engageably coiled around the shaft, in the space between the shaft and the source. magnetic flux flowing through the shaft flange attracts the free end of the helical spring and thereby causes the helical spring to contact about and engage the shaft. A flange external to the housing diverts at least a portion of the magnetic flux away from an interface between the housing and the shaft flange.

12 Claims, 4 Drawing Sheets

ELECTROMAGNETIC SPRING CLUTCH WITH BALANCED AXIAL FORCES

FIELD OF THE INVENTION

The present invention relates to electromagnetic spring clutches for selectively conveying rotational motion form an input hub to an output shaft, as commonly found, for example, in paper feed devices of printing or copying machines.

BACKGROUND OF THE INVENTION

Electromagnetically actuated spring clutches are well known in the art of paper feeding devices, as used in electrophotographic printers, copiers, facsimile machines, and the like. Typically, such a machine will include a main drive which rotates continuously when the machine is "on," whereas rotational motion for the output shaft is required only intermittently, as, for example, in moving individual sheets through a paper feed apparatus. To obtain this intermittent rotational motion from the continuous rotational motion of the main drive, an electromagnetic clutch is employed for selective engagement of the output shaft by the input hub. Within the clutch, a helical, torque-transmitting clutch spring carried by the input hub rotates about the output shaft. When a magnetic field is applied to the clutch spring, as by an external magnetic coil, the helical spring is caused to wrap down on and engage the sides of the output shaft, so that the rotational motion of the input hub is transmitted through the clutch spring to the output shaft. The clutch can be engaged and disengaged relatively rapidly by means of selectively energizing the magnetic coil.

A typical prior art magnetic clutch of a design commonly used in the art of paper-feeding devices is shown in radial cross-section in FIG. 1.

The input hub 10 rotates coaxially with the output shaft 12. Attached to input hub 10 is a fixed end of helical spring 14. (As this is a radial cross-sectional view, the individual turns of spring 14 are shown end-on, in cross-section, in FIG. 1.) Input hub 10 carries along helical spring 14 by its fixed end, so that a certain number of turns of the helical spring 14 near its free end 16 are disposed adjacent the side surface of output shaft 12. At the very tip of free end 16 of spring 14 is a tang 18.

Disposed around spring 14 is a source of electromagnetic flux, preferably an electromagnetic coil 20, here shown in cross-section. The coil 20 is at least partially enclosed by a housing 22, at least a portion of which is conductive of electromagnetic flux. One portion of housing 22 extends toward a bearing 24, which allows relative motion between the housing 22 and the output shaft 12. Bearing 24 is typically made of plastic or a nonmagnetic metal such as brass. Adjacent a surface of the housing 22 is a shaft flange 30, which is conductive of magnetic flux and extends around the outer circumference of output shaft 12 at a place adjacent the free end 16 of spring 14.

When electromagnetic coil 20 is energized, electromagnetic flux passes through the clutch in the path indicated by the bold arrows. The flux passes through housing 22 and then through shaft flange 30. The flux in shaft flange 30 causes the free end 16 of spring 14 to pull axially toward shaft flange 30, and this axial pull causes the turns at free end 16 of spring 14 to wrap down and engage the side surface of output shaft 12, thus engaging the clutch and permitting transference of rotational motion from the input hub 10 to output shaft 12.

In order to effect the axial pull of free end 16 of spring 14 toward shaft flange 30, two techniques are generally used. One possibility is to make spring 14 of a material conductive of electromagnetic flux, so that flux in shaft flange 30 will cause attraction between shaft flange 30 and the spring 14 itself. However, in practice it has been found that metal alloys which are effective for durable helical springs tend to have unsatisfactory magnetic properties, and vice-versa. One preferred method is to employ a control collar 32, which is an axially-movable hollow cylinder around spring 14, to act as a conduit for magnetic flux passing through the shaft flange 30. Control collar 32 preferably includes a slot 34 defined therein, to accept the tang 18 at the tip of the free end 16 of spring 14. As shown in FIG. 1, magnetic flux flows through the control collar 32 and passes over an axial air gap to housing 22, completing a circuit around coil 20. Even though control collar 32 moves axially with the spring 14 as the clutch is engaged and disengaged, an air gap is preferably always maintained between control collar 32 and housing 22, so as to avoid frictional contact at the interface when the clutch is in operation.

One significant problem which has been experienced with magnetic clutches of this and similar designs results when points of physical wear are also points along the magnetic flux path. Whenever a magnetic flux passes between two objects, such as between housing 22 and shaft flange 30, or between shaft flange 30 and control collar 32, an attractive magnetic force will exist between the two objects; this attractive force is what pulls the control collar 32 toward shaft flange 30. The magnitude of the attractive force is dependent on the square of the magnetic flux density, times the surface area of contact between the surfaces and a constant associated with the magnetic properties of the materials. If the two objects are in contact and moving laterally relative to each other, such as the rotating shaft flange 30 adjacent the stationary housing 22, a drag force exists equal to the magnetic attractive force times the coefficient of friction between the objects. Minimizing such forces in magnetic wrap spring clutches is necessary to extend clutch life and performance.

In the clutch of FIG. 1, the key wear area is the interface between housing 22 and shaft flange 30, where friction between these surfaces creates wear debris. Alternatively, the clutch may be dimensioned such that the shaft flange 30 bears axially against the bearing 24, to leave an air gap between shaft flange 30 and housing 22. This alternative arrangement reduces the frictional force and may provide for a better combination of wear resistant materials. However, an air gap between shaft flange 30 and housing 22 will not entirely eliminate wear forces and wear debris, and will decrease the magnetic force available for clutch activation. The wear debris will tend to migrate across the shaft flange 30, as shown by the black arrow in FIG. 1, and accumulate in the space between shaft flange 30 and the edge of the control collar 32. Ordinarily, de-energizing of the coil 20 causes the spring 14 to retract from shaft flange 30 and unwrap from output shaft 12 as the flux from the shaft flange 30 decays. However, a contamination of debris around the control collar 32 may interfere with the retraction of spring 14, and the clutch will be permanently stuck in an engaged mode.

In order to obviate the problems associated with wear areas in the flux path, numerous schemes have been proposed in the prior art. Reell Precision Manufacturing Corp., of St. Paul, Minn., manufactures a clutch with a "balanced radial flux path," as disclosed in U.S. Pat. No. 4,263,995 to Wahlstedt. An example of such a clutch is shown in FIG. 2, where like reference numerals from FIG. 1 indicate like elements. Here, the interface between the stationary housing 22 and the rotatable output shaft 12 includes a flange 40 and a nonmagnetic bearing 42. The flange 40 and bearing 42 are rigidly attached to the shaft 12 and rotate therewith. Although the flange 40 is in direct contact with the housing 22, flange 40 is homologous in function to the shaft flange 30 of the clutch of FIG. 1, in that the free end 16 of spring 14 is attracted toward it when the clutch is energized. A key distinction between this clutch and that of FIG. 1 is that the interface between the stationary housing 22 and the movable flange 40 in this clutch is an axial surface, and the flux path across this interface is radial with respect to the output shaft 12.

The flange 40 can be seen to conduct magnetic flux from the housing 22 to a control ring 44, which is attached to the free end 16 of spring 14. This control ring 44 performs the same function as the control collar 32 in the previous example, but control ring 44 has a much shorter axial length. Adjacent control ring 44 is a nonmagnetic bearing 46, which rotates with the output shaft 12. The gap between flange 40 and control ring 44 is appreciable even when control ring 44 is magnetically attracted toward flange 40; control ring 44 and flange 44 preferably never come in physical contact.

The clutch of FIG. 2 further includes an inner coil housing 48, which is stationary, and serves to complete the flux path around coil 20. There is a significant air gap between control ring 44 and inner coil housing 48, and thus there is no wear between these surfaces. More significantly, the flux path across the gap between control ring 44 and inner coil housing 48 is radial with respect to the output shaft 12. Thus, there are two radial portions of the flux path: the interface between housing 22 and flange 40, and the interface between control ring 44 and inner coil housing 48. The first of these portions of the flux path is radial and inward, and the second is radial and outward: these form the "balanced radial flux path" characteristic of this type of clutch. This design has been shown to have the advantages of avoiding any particular wear spots along the circumference of the output shaft 12, and also minimizing magnetic migration of wear debris within the clutch, thereby increasing the reliability.

Although the clutch of FIG. 2 has proven effective in avoiding certain problems associated with reliability in magnetic clutches, further improvements are possible, and in the art of paper feed devices, desirable.

It is one object of the present invention to provide a magnetic clutch which improves on the wear characteristics of magnetic clutches of the prior art.

It is another object of the present invention to provide such an improved magnetic clutch which diverts at least a portion of the flux path from crucial areas of physical wear.

It is another object of the present invention to provide such an improved magnetic clutch which minimizes wear by facilitating balanced axial magnetic forces within the clutch.

Other objects will appear hereinafter.

SUMMARY OF THE INVENTION

The present invention is an electromagnetically actuated spring clutch for engaging a rotatable shaft, permitting transference of rotational motion from a coaxially-disposed input hub to the shaft. A selectively actuable source of magnetic flux, such as an electromagnetic coil, is disposed around at least a portion of the shaft with a space therebetween. A housing, at least a portion of which is conductive of magnetic flux, substantially envelops the outer surface of the source. A shaft flange, also conductive of magnetic flux, is disposed around a portion of the shaft. A helical spring, having a first end attached to the input hub and a free end disposed adjacent the shaft flange, is loosely engageably coiled around the shaft, in the space between the shaft and the source. Magnetic flux flowing through the shaft flange attracts the free end of the helical spring and thereby causes the helical spring to contract about and engage the shaft. A flange external to the housing diverts at least a portion of the magnetic flux from the source away from an interface between the housing and the shaft flange.

In a preferred embodiment of the present invention, the amount of magnetic flux passing through the external flange is substantially equal to the amount of magnetic flux passing across the interface between the housing and the shaft flange. In this way axial magnetic attractive forces within the clutch are balanced.

BRIEF DESCRIPTION OF THE DRAWINGS

While the present invention will hereinafter be described in connection with a preferred embodiment thereof, it will be understood that is not intended to limit the invention to that embodiment. On the contrary, it is intended to cover all alternatives, modifications, and equivalents as may be included within the spirit and scope of the invention as defined by the appended claims.

In all of the figures, like reference numerals refer to like elements.

DETAILED DESCRIPTION OF THE INVENTION

Figure 3:
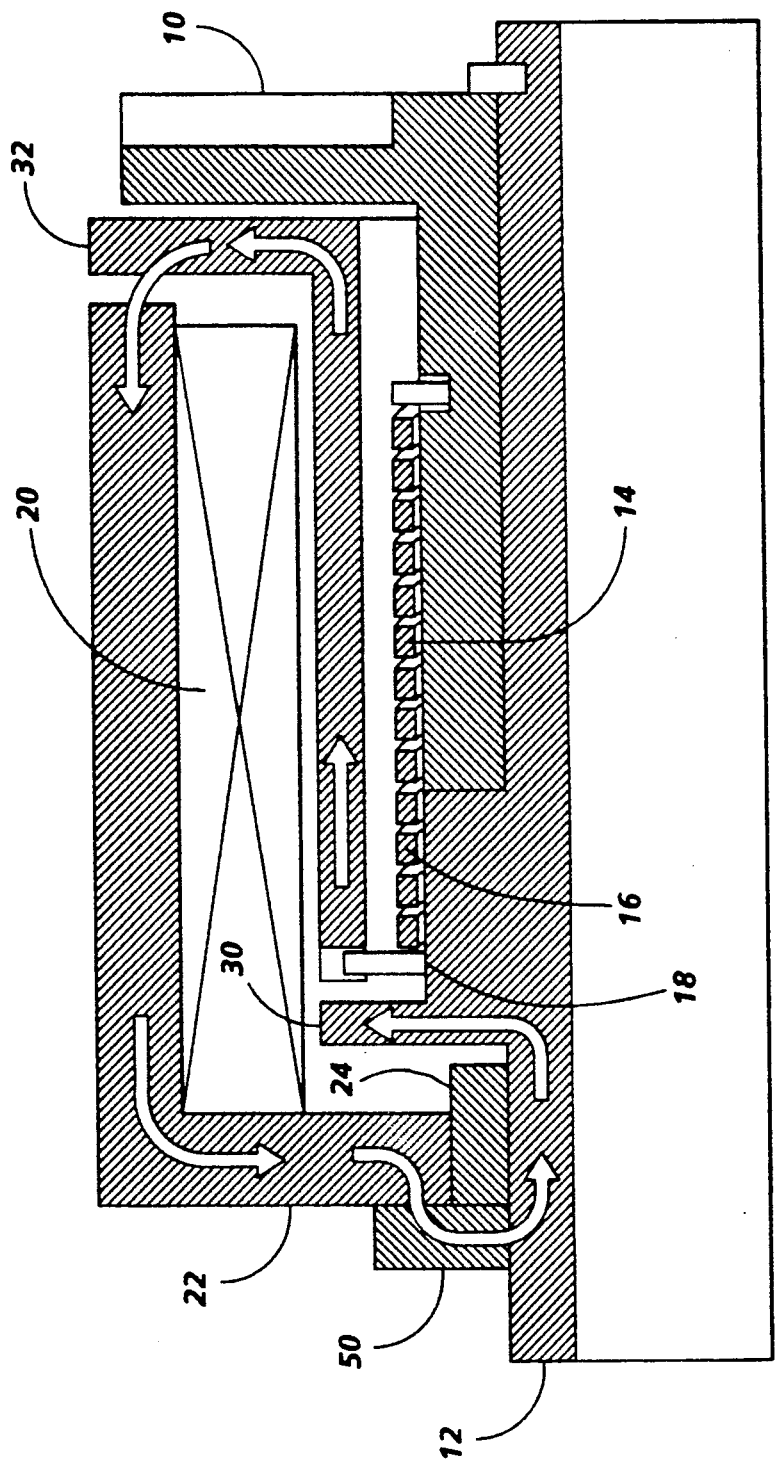
FIG. 3 is a cross-sectional view through a radius of a magnetic clutch according to one aspect of the present invention.

FIG. 3 is a cross-sectional view through a radius of a magnetic clutch according to one aspect of the present invention. In many respects the clutch of FIG. 3 is similar to the prior art magnetic clutch of FIG. 1, and shares numerous attributes with all wrap-spring magnetic clutches. Once again, input hub 10 carries a fixed end of a helical spring 14, while the free end 16 of spring 14 is disposed adjacent the side surfaces of output shaft 12. When electromagnetic coil 20 is energized, the resulting magnetic flux path, indicated by the bold arrows, causes axially-movable control collar 32 to be attracted to shaft flange 30. Control collar 32 is attached to the free end 16 of spring 14. The motion of control collar 32 toward shaft flange 30 causes axial stretching of spring 14, which in turn causes the turns of spring 14 to contract on and engage the side surfaces of output shaft 12. This engagement permits transference of rotational motion from the rotating input hub 10 to output shaft 12.

In addition to the conventional elements of prior art magnetic clutches, the clutch of FIG. 3 further includes an external flange 50. External flange 50 is rigidly attached around a circumference of output shaft 12 at a point adjacent an outer surface of housing 22. External flange 50 is made of a material which is conductive of magnetic flux, such as steel. A surface of external flange 50 is in close proximity to the outer surface of housing 22, so that a flux path may be directed from the housing 22 to the external flange 50. At least a portion, if not all, of the output shaft 12 is itself conductive of electromagnetic flux; to make the output shaft 12 of steel is common, if not standard, in the prior art. Disposed between the side of output shaft 12 and housing 22 in non-magnetic bearing 24, which is rigidly attached to output shaft 12, and which permits relative motion between the output shaft 12 and the stationary housing 22. External flange 50 and bearing 24 rotate with output shaft 12, against the stationary housing 22.

As can be seen by the bold arrows in FIG. 3, external flange 50 creates a flux path through the clutch which effectively diverts at least a large portion of the magnetic flux away from the space between housing 22 and shaft flange 30. The air gap between housing 22 and shaft flange 30 is preferably sufficiently large so that the bulk of the magnetic flux passing through the housing 22 will pass through external flange 50, as opposed to passing across the air gap. From shaft flange 30, magnetic flux passes to control collar 32, and moves axially to the distal portion of coil 20, as shown, to complete the circuit around coil 20.

(Although, in all of the figures, the electromagnetic flux generated by coil 20 is shown "flowing" in a clockwise direction around the illustrated radial cross-section of coil 20, it will be appreciated by those skilled in the art that the actual direction of magnetic flux through the flux path is not crucial to the operation of any of the illustrated clutches; the attractive forces in the clutch will be evident regardless of the direction of flux.)

Figure 1:
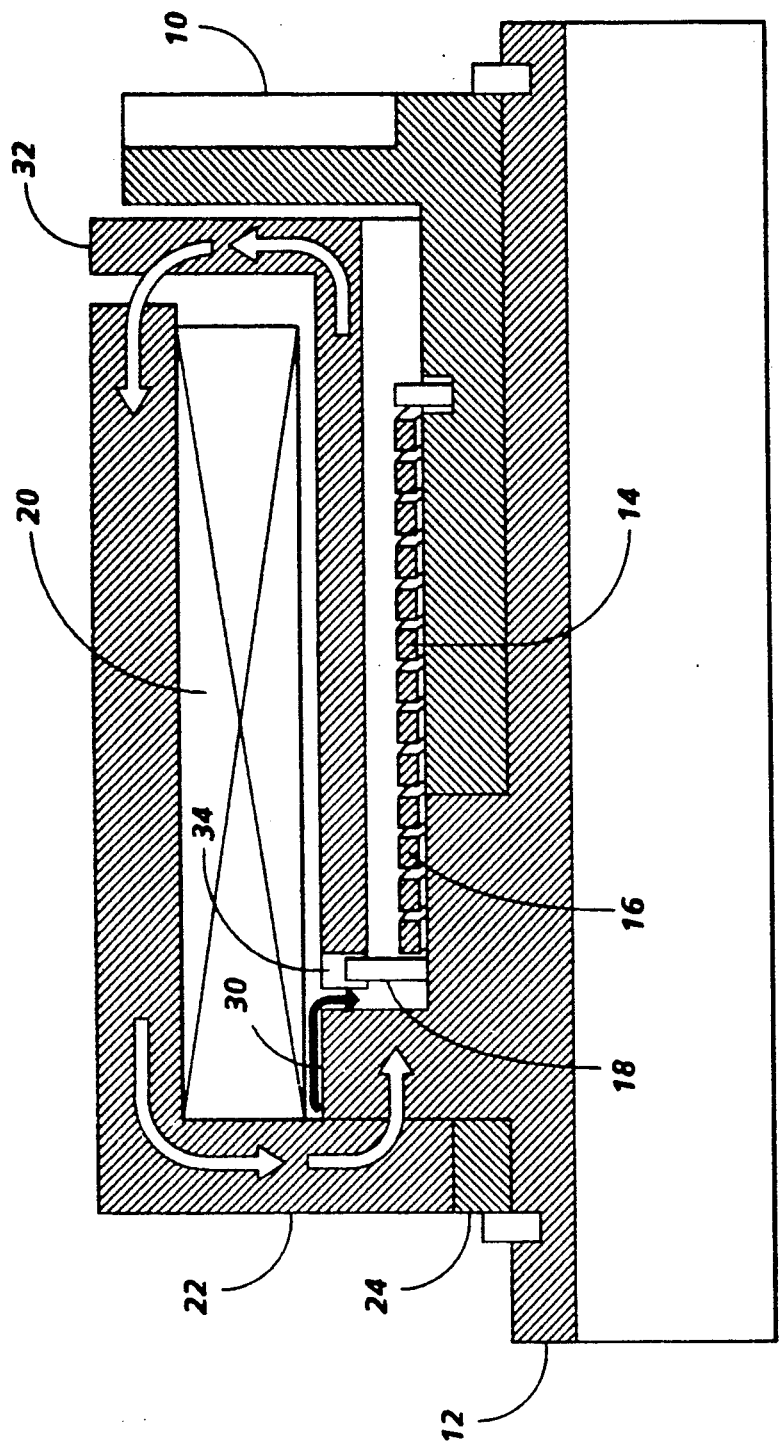
FIG. 1 is a cross-sectional view through a radius of a typical magnetic clutch of the prior art.

The diversion of the magnetic flux by external flange 50 tends to obviate many of the problems of wear associated with magnetic clutches of the type shown in FIG. 1. First, the key wear area of the clutch of FIG. 3, the interface between housing 22 and external flange 50, is external to the space enclosed by housing 22. For this reason, wear debris caused by abrasion between the surfaces is not likely to migrate into the space around shaft flange 30 and control collar 32, where wear debris tends to cause reliability problems as described above. Secondly, the diversion of magnetic flux away from the air gap further tends to prevent an accumulation of wear debris within the housing 22. One possible disadvantage of the clutch of FIG. 3, however, is that the longer flux path through the clutch as a whole may tend to impose a greater magnetic resistance in the clutch. A greater magnetic resistance in the clutch will lower the amount of magnetic force available to actuate the clutch, and thus limit the ability of the clutch to be actuated under varying conditions, such as voltage fluctuations and low voltage.

Figure 4:
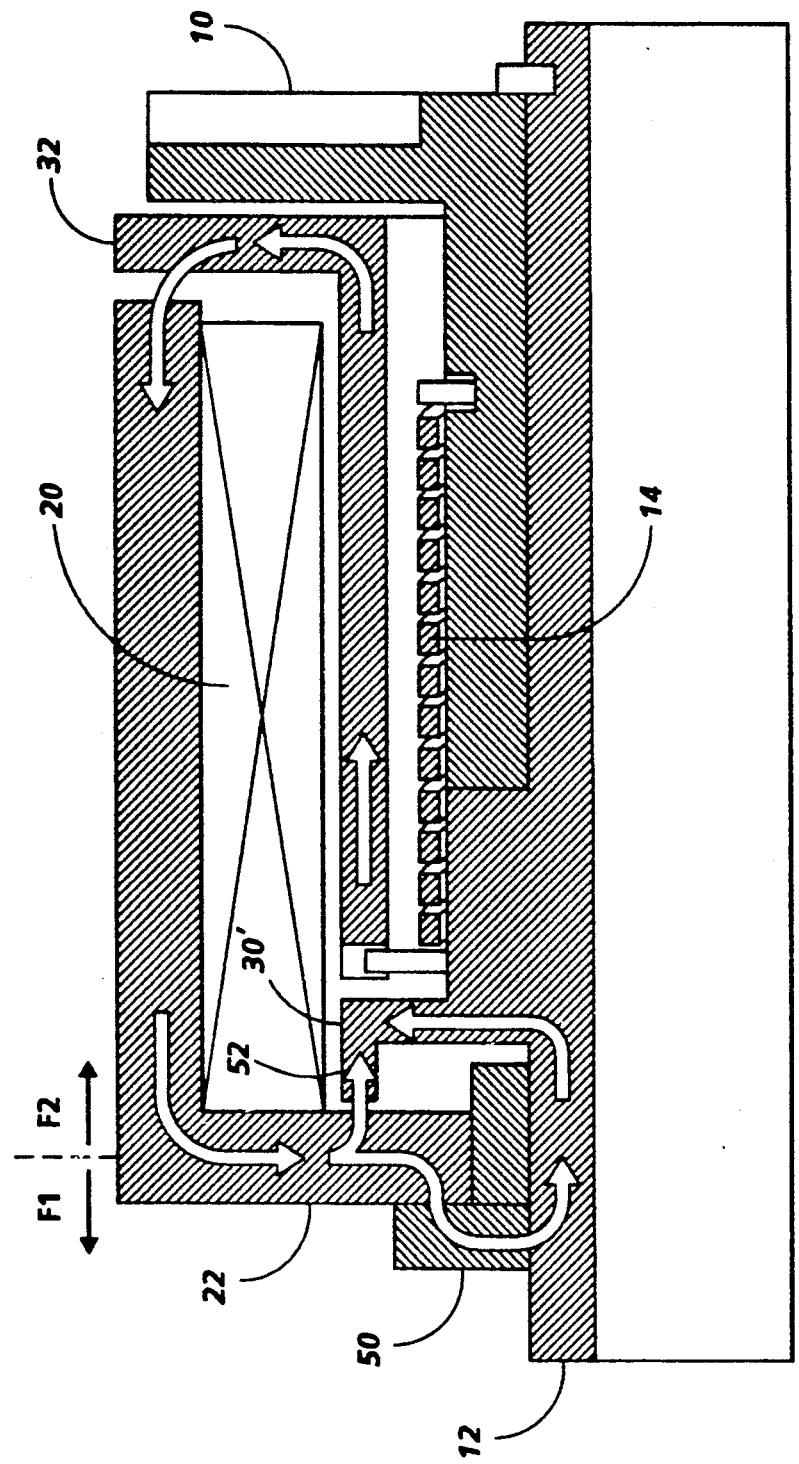
FIG. 4 is a cross-sectional view through a radius of a magnetic clutch according to the preferred embodiment of the present invention.

An enhanced version of the magnetic clutch of FIG. 3 is shown in FIG. 4, which represents the preferred embodiment of the present invention. This embodiment is similar in all respects to that of FIG. 3, except that the shaft flange, here indicated as 30', is specially modified to include a magnetic choke 52. Magnetic choke 52 is simply a protuberance of metal from the shaft flange 30' toward the adjacent portion of the inner surface of housing 22. (As the views in the present application are all cross-sections through a radius of each magnetic clutch, it will be appreciated that the protuberance shown as magnetic choke 52 is in fact a ring, when extended through the entire circumference of the clutch.)

Magnetic choke 52 is so dimensioned, particularly regarding the amount of surface area adjacent to the inner surface of housing 22 and the spacing therefrom, that only a limited quantity of magnetic flux can pass through the air gap from housing 22 to the magnetic choke 52. Because the surface area at the tip of magnetic choke 52 is relatively small, flux passing therethrough will be of a great density and thus easily saturate the cross-sectional area of magnetic choke 52. The remainder of the flux passing through housing 22 must pass through external flange 50, as in the clutch of FIG. 3 above. As can be seen by the bold arrows in FIG. 4, magnetic flux passes to the operative portion of shaft flange 30' from two directions: directly through magnetic choke 52, or through the path of external flange 50. Looked at another way, flux passes out of housing 22 in two directions: through magnetic choke 52 (toward the interior of housing 22), or through external flange 50 (away from the interior of housing 22).

Ideally, the two flux paths from housing 22 should recieve substantially equal proportions of the total flux passing through the clutch. This proportioning of the total flux may be accomplished by optimizing the dimensions of magnetic choke 52, taking into account factors such as the materials of various elements in the clutch and the longer (and therefore more resistive) path through external flange 50.

If the two paths are substantially equal, an advantageous situation will result: the axial force caused by the passage of flux between housing 22 and external flange 50 (shown as F1 in FIG. 4) will be counteracted by the axial force F2, in the opposite axial direction, caused by the passage of flux between housing 22 and magnetic choke 52. The mutual cancellation of these two axial forces means that there will be no net axial force on the housing 22. If there is no net axial force on the housing 22, there will be no axial force urging housing 22 against external flange 50; housing 22 and external flange 50 need not even be in contact with each other. If these two parts are not in contact with each other, there can be no abrasion between them when output shaft 12 is rotating, and therefore there will ideally be no mechanical wear in this area. Even in a non-ideal situation, a partial cancellation of axial forces F1 and F2 will tend to reduce the drag force between housing 22 and external flange 50, thus reducing the wear between these parts.

Figure 2:
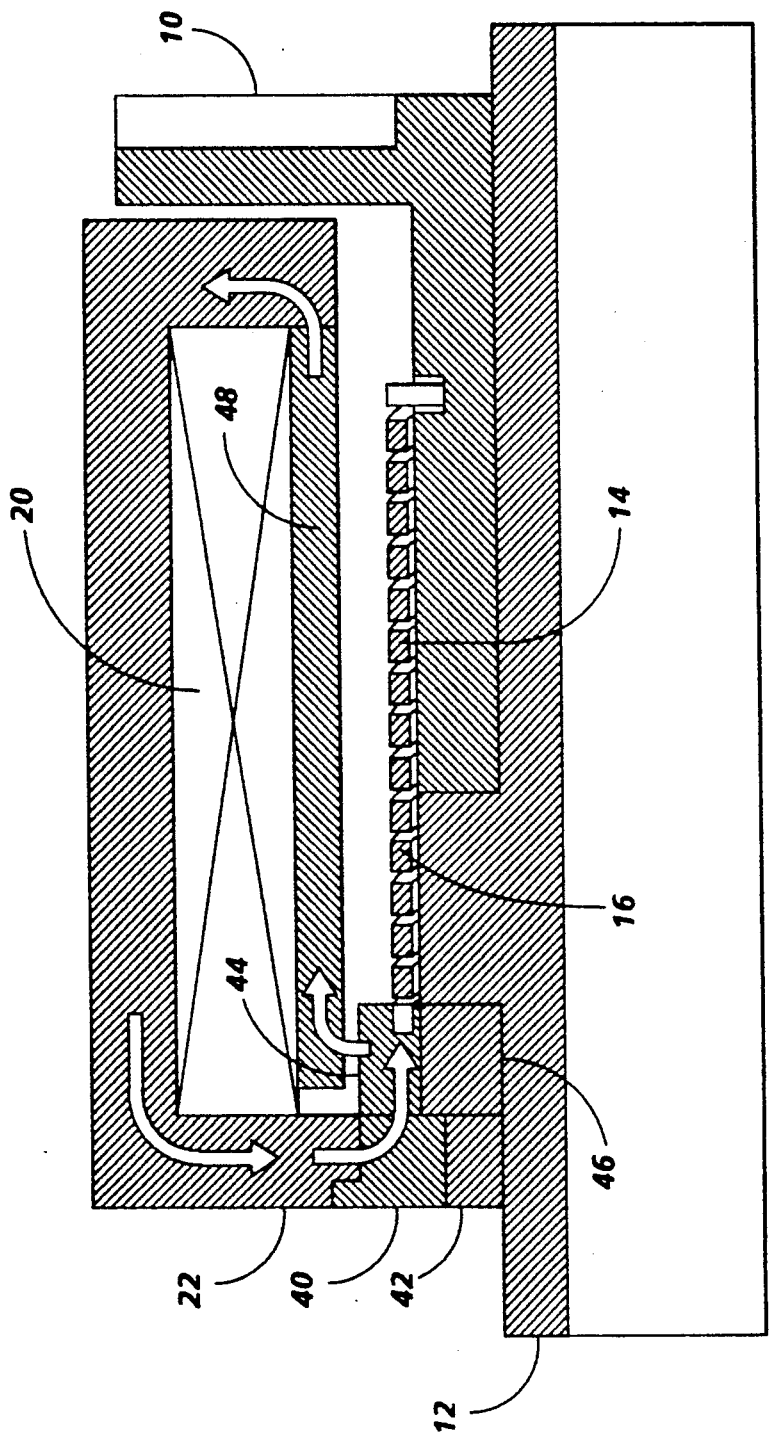
FIG. 2 is a cross-sectional view through a radius of a prior art magnetic clutch of a specific type.

Comparing the clutch of the preferred embodiment in FIG. 4 with the prior art clutch of FIG. 2, it will be seen that, whereas the prior art clutch facilitates a balance in radially-oriented flux paths, the present invention facilitates a balance in axially-oriented flux paths. The present invention provides advantages such as reducing or eliminating axial magnetic attractive forces between moving and stationary elements, thus minimizing friction and wear. Further, because the key area of physical wear is disposed external to the housing 22, what wear debris there is will not be likely to migrate toward the space around the shaft flange 30. The present invention thus marks an improvement in reliability over prior-art magnetic clutches.

While this invention has been described in conjunction with a specific apparatus, it is evident that many alternatives, modifications, and variations will be apparent to those skilled in the art. Accordingly, it is intended to embrace all such alternatives, modifications, and variations as fall within the spirit and broad scope of the appended claims.

What is claimed is:

1. An electromagnetically actuated spring clutch for engaging a rotatable shaft, permitting transference of rotational motion from a coaxially-disposed input hub to the shaft, comprising:
   a selectively actuable source of magnetic flux, disposed around at least a portion of the shaft with a space therebetween, having an inner surface facing the shaft, and an outer surface;
   a housing substantially enveloping the outer surface of the source, at least a portion of the housing being conductive of magnetic flux;
   a shaft flange, disposed around a portion of the shaft, conductive of magnetic flux;
   a helical spring loosely engageably coiled around the shaft, in the space between the shaft and the source, and having a first end attached to the input hub and a free end disposed adjacent the shaft flange;
   means for attracting the free end of the helical spring toward the shaft flange when magnetic flux is flowing through the shaft flange, thereby causing the helical spring to contract about and engage the shaft; and
   means including a member disposed external to the housing and so shaped and dimensioned for diverting a substantial portion of the magnetic flux away from an interface between the housing and the shaft flange.

2. A clutch as in claim 1, wherein the means for attracting the free end of the helical spring toward the shaft flange comprises an axially movable control collar, disposed between the source and the spring, conductive of magnetic flux, and attached to the free end of the spring.

3. A clutch as in claim 1, further comprising at least one bearing disposed around the shaft, contacting the shaft and the housing, adapted to permit relative motion between the shaft and the housing, and being nonconductive of magnetic flux.

4. A clutch as in claim 1, wherein the diverting means comprises an external flange rigidly attached to a circumference of the shaft, and forming an axial flux path between a portion of the housing and a surface of the external flange.

5. A clutch as in claim 4, wherein at least a portion of the shaft is conductive of magnetic flux between the external flange and the shaft flange.

6. A clutch as in claim 4, wherein an interface between the housing and the shaft flange is radially disposed so that a flux path between the housing and the shaft flange is axial with respect to the shaft.

7. A clutch as in claim 4, wherein an interface between the housing and the external flange is radially disposed so that a flux path between the housing and the external flange is axial with respect to the shaft.

8. A clutch as in claim 4, wherein the shaft flange is so shaped and positioned relative to the housing that the amount of magnetic flux passing through the external flange is substantially equal to the amount of magnetic flux passing across the interface between the housing and the shaft flange.

9. A clutch as in claim 8, wherein the interfaces between the housing and the shaft flange and between the housing and the external flange are radially disposed so that the flux paths between the housing and the shaft flange and between the housing and the external flange are axial with respect to the shaft, and wherein the magnetic attractive forces associated with the flux paths substantially cancel each other.

10. A clutch as in claim 1, wherein the shaft flange is so shaped and positioned relative to the housing that the amount of magnetic flux passing between the housing and the shaft flange is substantially equal to the amount of flux being diverted away from the interface.

11. A clutch as in claim 10, wherein the means for diverting at least a portion of the magnetic flux comprises an external flange, disposed external to the housing, rigidly attached to a circumference of the shaft, and forming an axial flux path between a portion of the housing and a surface of the external flange.

12. A clutch as in claim 11, wherein the interfaces between the housing and the shaft flange and between the housing and the external flange are radially disposed so that the flux paths between the housing and the shaft flange and between the housing and the external flange are axial with respect to the shaft, and wherein the magnetic attractive forces associated with the flux paths substantially cancel each other.

* * * * *